United States Patent [19]
Hendricks

[11] 4,081,048
[45] Mar. 28, 1978

[54] AUTOMATIC TORQUE SENSOR

[76] Inventor: William E. Hendricks, 1305 Arrowhead, Wichita, Kans. 67203

[21] Appl. No.: 599,179

[22] Filed: Jul. 25, 1975

[51] Int. Cl.² ........................................... B62M 7/08
[52] U.S. Cl. .................................. 180/33 D; 180/74
[58] Field of Search ............... 180/14 R, 14 A, 14 B, 180/14 E, 65 R, 74, 33 R, 33 D, 34, 33 C

[56] References Cited

U.S. PATENT DOCUMENTS

| | | | |
|---|---|---|---|
| 2,522,112 | 9/1950 | Gilmour | 180/74 X |
| 2,623,603 | 12/1952 | Cutlan et al. | 180/74 X |
| 2,705,859 | 4/1955 | Burg | 180/74 X |
| 2,920,845 | 1/1960 | Palmiter | 180/74 X |
| 3,056,460 | 10/1962 | Hanson | 180/74 X |
| 3,429,584 | 2/1969 | Hendricks | 280/261 |
| 3,869,012 | 3/1975 | Schubach | 180/11 |
| 3,878,910 | 4/1975 | Walker, Jr. | 180/74 X |
| 3,891,044 | 6/1975 | Tiede | 180/74 X |
| 3,905,442 | 9/1975 | O'Neill, Jr. | 180/33 D |

FOREIGN PATENT DOCUMENTS

| | | | |
|---|---|---|---|
| 1,031,966 | 6/1953 | France | 180/33 D |
| 307,672 | 5/1933 | Italy | 180/65 R |
| 379,324 | 3/1940 | Italy | 180/34 |
| 220,905 | 4/1942 | Switzerland | 180/34 |
| 673,382 | 6/1952 | United Kingdom | 180/33 D |

Primary Examiner—Joseph F. Peters, Jr.
Assistant Examiner—Terrance L. Siemens
Attorney, Agent, or Firm—Robert E. Briedenthal

[57] ABSTRACT

A friction drive for a vehicle wherein a friction drive wheel is mounted to engage frictionally the pneumatic tire constituting the periphery of a vehicle traction wheel, such drive wheel being carried on a strut mounted to swing about an axis remote therefrom and which is parallel to and spaced from the axis of the traction wheel in an arrangement such that the strut is subjected to a reaction torque in response to driving friction force in one direction which in turn urges the center of the drive wheel towards the center of the ground wheel. The drive wheel is of lesser diameter than the traction wheel so as to effect a reduction in rate of rotation, and is of frusto-conical configuration so that a variation in drive ratio can be driven by a storage battery powered direct current motor, with the batteries carried either on the vehicle or on a trailer towed thereby.

14 Claims, 15 Drawing Figures

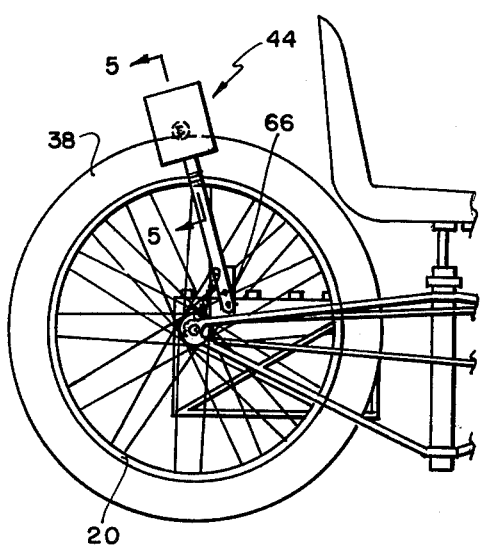
FIG. 4
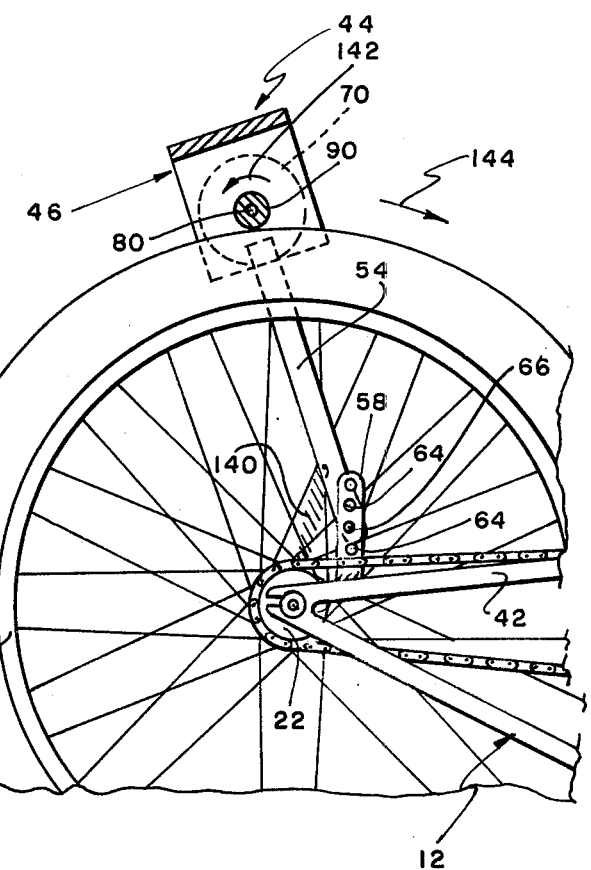
FIG. 7
FIG. 8
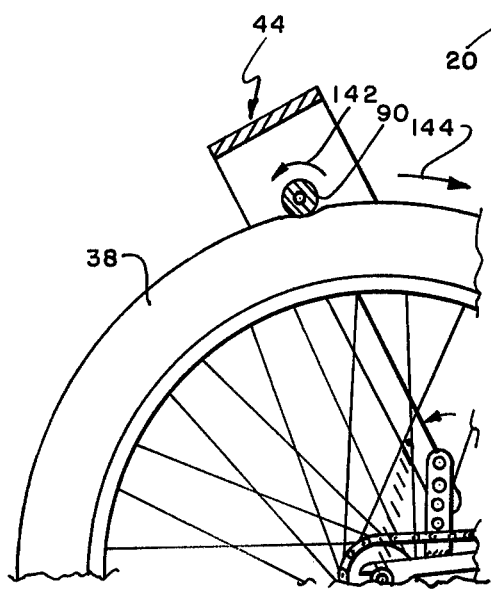
FIG. 9
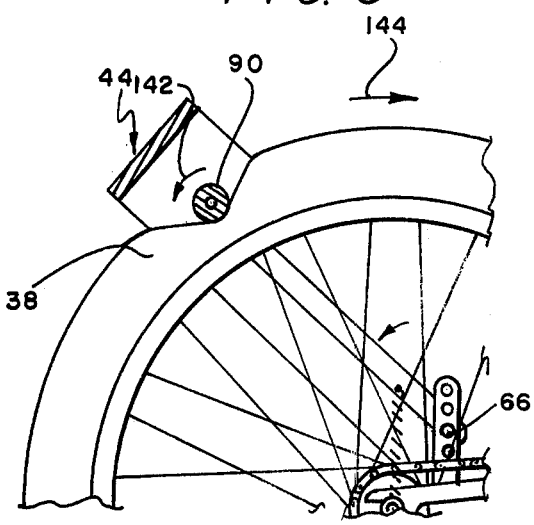

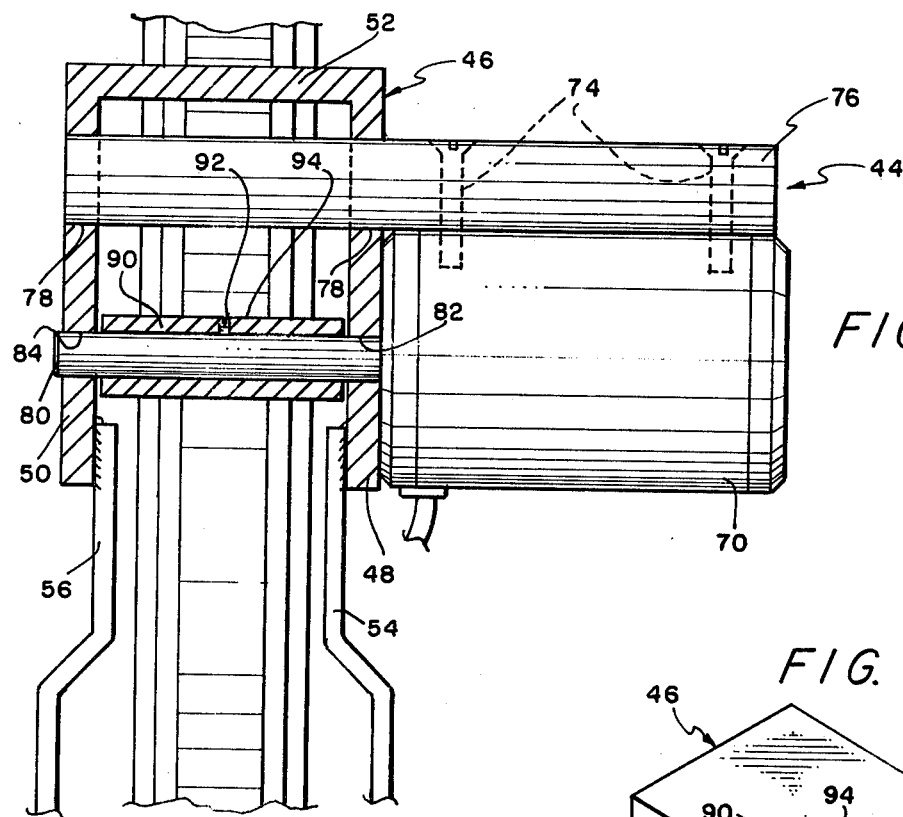
FIG. 5
FIG. 6
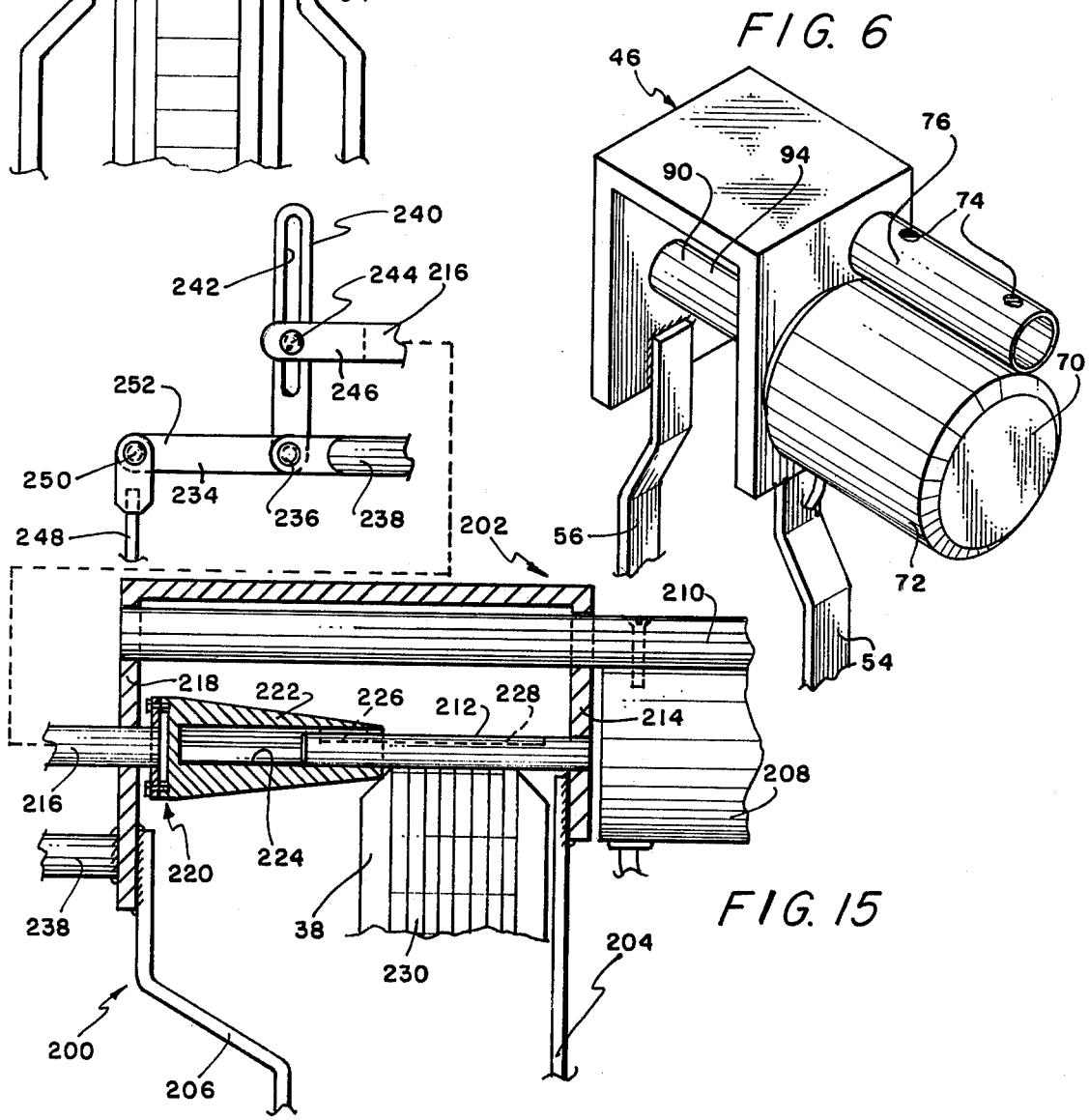
FIG. 15

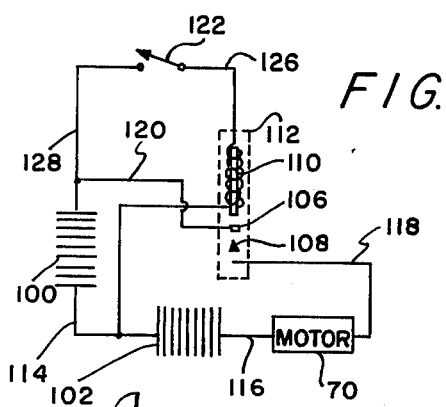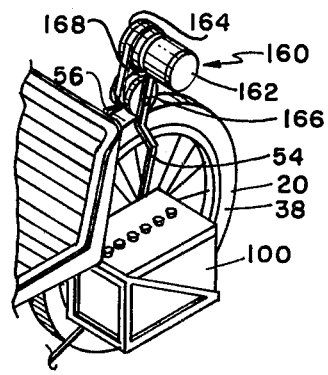

AUTOMATIC TORQUE SENSOR

The present invention pertains to new and useful improvements in frictional drives, and more particularly pertains to a frictional drive system such that the elements that are in frictional contact are urged together by a force normal to the direction of the frictional force that varies in magnitude in the same sense as the latter.

Various schemes exemplified by the disclosures of the following U.S. patents have been proposed for imparting by friction a driving force to the periphery of a wheel, and a background understanding of the prior art can be obtained by the uninitiated on study of the same:

U.S. Pat. No. 2,920,845, Palmiter, Jan. 12, 1960;
U.S. Pat. No. 3,688,857, Miller, Sept. 5, 1972;
U.S. Pat. No. 2,493,275, Thornton, Jan. 3, 1950;
U.S. Pat. No. 2,328,233, Schunk, Aug. 31, 1943;
U.S. Pat. No. 715,889, Smith, Dec. 16, 1902;
U.S. Pat. No. 1,394,328, Miller, Oct. 18, 1921;
U.S. Pat. No. 1,436,788, Baker, Nov. 28, 1922;
U.S. Pat. No. 3,005,510, Phillips, Oct. 24, 1961.

Each of the systems heretofore proposed appear to have one or more deficiencies, the most notable appearing to be the force normal to the frictional force does not automatically vary in a manner approximating linearity with respect to the amount of such force required to preclude substantial slippage of the frictional engagement.

While it is a simple matter to preset a fixed normal force adequate to preclude slippage between the frictionally contacting elements of any system, it will be noted that maintenance of such a normal force will entail needless energy losses in moving parts associated with structure supporting such normal force when the desired frictional forces fall substantially below the maximum values thereof for which the normal force is preset. They therefore must encounter a substantial residual drag at all times.

It is also a simple matter to provide structure such that the normal force can be varied by the operator of the system, but such an arrangement requires an amount of operator supervision that is generally proportional to the need for the provision itself. Such a system will ordinarily require instrumentation for operator guidance, or the operator varying the normal force to ascertain frequently the magnitude of the force at which slippage occurs.

The primary aim of the instant invention is to provide a frictional drive system such that the normal force will vary automatically so as to be increased when the frictional force in one direction increases and decrease automatically when the frictional force in one direction lessens.

Another important aim in accordance with the foregoing aim is to provide such a system such that the drive ratio between the frictionally engaging elements can be varied.

Yet another important aim is to provide an ecologically desirable vehicle propulsion system utilizing electric storage batteries that can be carried by the vehicle or on a trailer towed thereby.

The central objective may be said to be the provision of a friction drive such that the force with which frictionally engaged parts is caused automatically to vary as a function of the friction force, such drive being suitable for vehicle propulsion as well as for any other environment wherein a frictional drive can be employed.

A broad aspect of the invention involves a frictional drive system of the type wherein a driving member and a driven member each include a movable endless peripheral part that travels a closed planar track about a region, with such tracks being coplanar and the regions being exclusive of each other, and wherein the peripheral part of the driving member bears with force against and is in frictional engagement with the peripheral part of the driven member whereby movement of the driving member part in one direction frictionally urges movement of the driven member part in such one direction, the improvement comprising means for automatically varying the bearing force in response to variations in the magnitude of reactive force experienced by the driven member part in frictionally urging movement of the driven member part, said means comprising the provision of means for mounting the driving member for movement toward and away from the driven member along a path that is angularly intermediate the directions of the bearing and frictional forces, whereby the bearing force can be minimized as it tends to vary in a manner sufficient to sustain essentially non-sliding frictional engagement of the respective parts of the driving and driven members.

A somewhat differing aspect of the invention involves a vehicle having a ground support traction wheel provided with an improved means for applying a torque to such wheel to propel the vehicle comprising means for imparting a tangential frictional force to the radial periphery of the wheel, said means including a driving unit mounted for movement relative to the wheel in a direction that is inclined to the direction of the tangential force in an arrangement such that the driving unit is urged radially inwardly relative to the ground wheel with a force that automatically varies as a function of the magnitude of the frictionally imparted torque, and said unit including a driving wheel rotatable about an axis parallel to the ground wheel, said wheels having their radially outermost peripheral portions in frictional engagement with each other, and at least one of said wheels having an outermost radial periphery that is resiliently radially compressible.

The invention will be best understood upon considering hereinafter described preferred embodiments of the same, such description being given in conjunction with the accompanying drawings, wherein:

FIG. 1 is an isometric drawing of a three-wheeled rider-propelled vehicle of the general type as disclosed in U.S. Pat. No. 3,429,584, which issued to me Feb. 25, 1969, the same being provided with an auxiliary electric power means coupled to drive the periphery of the rear traction wheel by frictional coupling or drive according to the invention;

FIG. 4 is a fragmentary vertical sectional view of the rear end portion of the vehicle taken upon the plane of the section line 4—4 of FIG. 3;

FIG. 5 is an enlarged sectional detail view taken upon the plane of the section line 5—5 in FIG. 4;

FIG. 6 is an enlarged and fragmentary isometric view of a portion of the drive unit shown apart from other structure;

FIG. 7 is a vertical sectional detail view taken upon the plane of the section line 7—7 in FIG. 3, with certain hidden parts being shown in dashed outline, and with arrows depicting the directions of rotation of the drive unit and the driven wheel;

FIGS. 8 and 9 are generally similar to FIG. 7, but show the progressively changing relationships of the drive unit and the driven ground wheel as the frictionally applied torque to the latter progressively increases beyond that of FIG. 7;

FIG. 10 is an electrical schematic diagram of the scheme for controlling energization of the drive unit;

FIG. 11 shows a modification of the means for carrying the storage batteries and shows the latter as being carried by a towed trailer rather than by the primary vehicle;

FIG. 12 is a top plan view of the structure shown in FIG. 11;

FIG. 13 is a fragmentary isometric view of a modified drive unit;

FIG. 15 is a broken transverse sectional detail view of still another drive unit wherein the frictional drive ratio can be changed by axially moving a frustoconical drive wheel.

Figure 1:
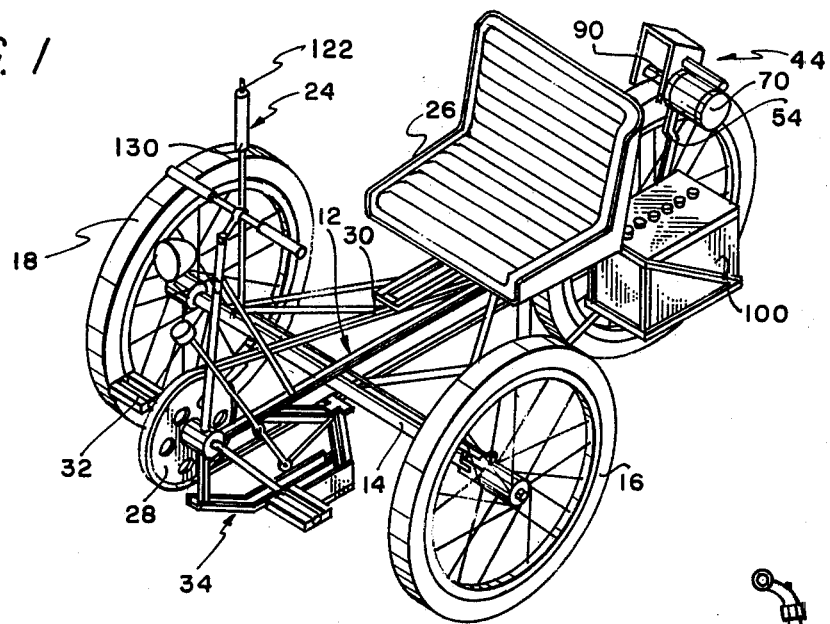
Figure 2:
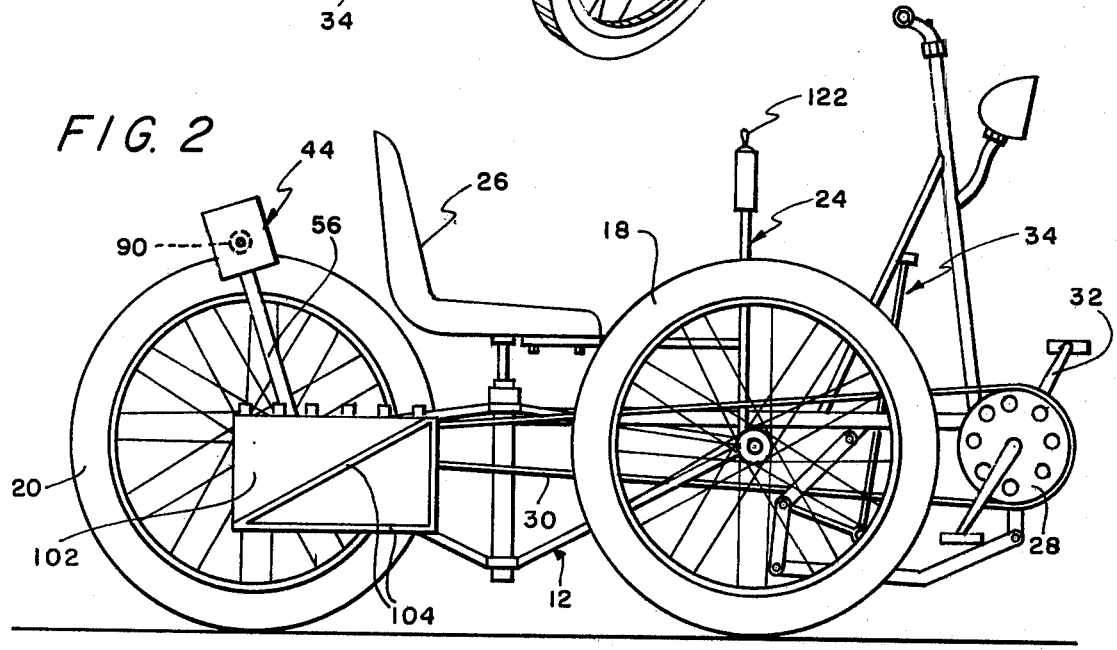
FIG. 2 is a side elevational view of the vehicle shown in FIG. 1.

Referring now to the drawings wherein like numerals designate like parts throughout the various views, and directing attention initially to the form of the invention shown in FIGS. 1 through 10, the reference numeral 10 designates a wheeled vehicle generally. The vehicle 10 shown is of the three-wheeled type as shown in U.S. Pat. No. 3,429,584 entitled THREE-WHEELED VEHICLE, which issued to me Feb. 25, 1969. While the subject matter of the present invention has beautiful and conceivably the most beneficial applicability to the illustrated type of vehicle 10, it will be evident that the present invention can be applied to not only other types of three-wheeled vehicles, but to vehicles having two tandum wheels, four wheels, etc. Furthermore, before proceeding with a detailed description of the present invention as applied to the illustrated vehicle 10, it must be made clear that the vehicle can include a propulsion scheme additional to the frictional drive scheme hereinafter to be described or not, and if such an additional propulsion scheme is provided, it can include a prime mover (electrical or fuel consuming) or be of a rider operated or driven type such as is the case with the illustrated vehicle 10. Finally, before proceeding, the frictional drive of the present invention can be associated with a ground wheel other than one driven by any additional propulsion scheme, or can be associated directly with a ground wheel that can have additional propulsion means that can be operated at any time desired whether the frictional drive is delivering driving torque or not.

That the foregoing comments are well founded will become quite evident to those familiar with the art as the following description proceeds, though comprehension of the wide fields of application of the system will be acquired more readily with such comments regarding various applications being borne in mind from the beginning.

The vehicle 10 has a frame 12 that includes a transverse member 14 on the opposite ends of which a pair of front dirigible ground support wheels 16 and 18 are pivotally mounted.

Mounted at the rear bifurcated end of the frame 12 in a manner quite analogous to the conventional mounting of the rear wheel of a bicycle is a ground support wheel 20, which in and of itself can be a conventional rear bicycle wheel inclusive of conventional hub structure havng a driven sprocket 22 operatively associated with a free wheeling system such that application of torque to the sprocket 22 in the forward direction is communicated directly to the wheel.

Braking means are provided which can be of any character desired, such as the conventional rim type (not shown), and can be applied, for example, to the wheels 16 and 18 in lieu of or in addition to the wheel 20. Alternatively, the long used "coaster brake" style drive and braking hub could be employed.

It is to be emphasized at this point that the wheel 20 can be mounted on the frame 12 without any provision to drive the same from any sprocket.

If the wheel 20 is to be hub driven, those conversant with the bicycle art will recognize that the long known derailleur system mentioned in the excellent article *Bicycle Technology* appearing in (and illustrated on the cover of) the March 1973 issue of the SCIENTIFIC AMERICAN could be used in lieu of the simple chain and sprocket system shown.

Though constituting no part of the present invention per se, the vehicle 10 includes a lever actuated steering system 24 that is operatively associated with a rider seat 26 in that the seat 26 turns in the direction of the movement of the lever 24 (and vice versa) in effecting a turn in such direction of the dirigible wheels 16 and 18.

The vehicle 10 also includes drive sprocket 28 mounted at the front end of the frame 12, with an endless chain 30 entrained over the sprockets 22 and 28. Pedal cranks 32 enable the rider to apply torque to the sprocket 28 and therefore to the driven sprocket 22.

Also not constituting a part of the invention per se, the vehicle 10 includes a combined dynamic and parking brake system 34.

The bare bone essentials of the structure thus far described insofar as the present invention is concerned is that the ground support wheel 20 is mounted upon and lends its support to the frame 12 of a multiwheeled vehicle 10 such that the frame 12 does not normally rock about any axis parallel to the axis of the wheel 20 relative to the ground surface 36 on which the vehicle is supported.

The wheel 20 preferably includes a pneumatic tire 38, as shown, or is otherwise provided with an outer peripheral portion that is essentially radially compressible in a resilient fashion and which preferably also has a surface material having a relatively high coefficient of friction with metals as compared to metals generally and conventional synthetic resins such as TEFLON (trademark of DuPont), nylon, polyethylene, and the like. The radial compressibility is not an absolute essential, and any surface offering a sufficient frictional characteristic would be satisfactory.

Figure 3:
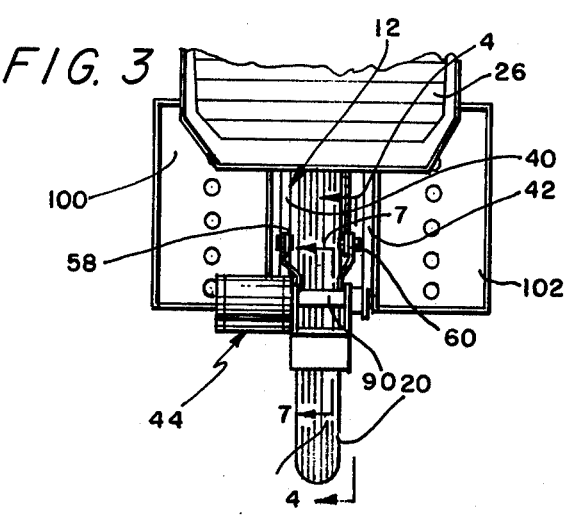
FIG. 3 is a fragmentary top plan view of the rear end portion of the vehicle shown in FIGS. 1 and 2.
Figure 14:
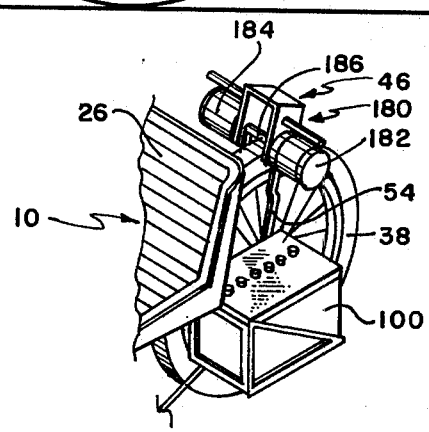
FIG. 14 is generally similar to FIG. 13 and shows yet another modified drive unit.

The rear end of the frame 12 is bifurcated and includes portions 40 and 42 on opposite sides of the wheel as clearly shown in FIG. 3, and the frictional drive unit designated generally at 44 is carried by such frame portions 40 and 42 as will now be explained. The drive unit 44 includes an inverted U-shaped member 46 comprised of legs or flanges 48 and 50 integrally connected by a web 52. A strut structure comprised of a pair of straps or legs 54 and 56 depend from and are rigidly welded to the flanges 48 and 50 as shown and the lower ends of the legs 54 and 56 are respectively pivoted to mounting brackets 58 and 60 detachably mounted or, as shown, securely fixed to frame portions 40 and 42. Such pivotal connections are identical and a detailed description of one will suffice for both, it being understood that the pivotal axes involved are aligned.

Accordingly, the bracket 58 is welded to the frame portion 42 to extend upwardly from a position slightly forward and above the axis of the wheel 20. The bracket 58 has a plurality of spaced openings 64, and a cotter pin secured pivot pin 66 extends through a selected opening 64 and a single opening (not shown) provided in the strut or strap 54, whereby the position of the pivotal connection of the unit 44 relative to the axis of the wheel 20 can be varied as desired. Such pivotal connection is about an axis parallel to the axis of the wheel 20 and it should be noted at this time that the parts thus far described are arranged so that rearward swinging movement of the unit 44 about the pivot 66 is such that, when the unit 44 is disposed above the axis of the wheel 20 and adjacent the radially outward periphery of the latter, the unit 44 moves relatively nearer the axis of the wheel 20 along a path that is inclined to a line therefrom to the axis of the wheel by an angle approaching 90°. The adjustability of the position of the pivot 66 enables a range of selectivity as to the inclination of such path as will be evident.

The unit 44 additionally comprises a direct current motor 70, the housing 72 of which is detachably secured by threaded fastening means 74 to a tubular support bracket 76 that extends through aligned openings 78 in and is welded to the flanges 48 and 50 of the member 48, as clearly shown in FIG. 5. The motor 70 is preferably of the series wound type and has its output shaft 80 journaled through aligned openings 82 and 84 in the flanges 48 and 50. Though not shown, any suitable antifriction bearing means can be employed in a conventional manner to minimize friction and wear as between the shaft 80 and the U-shaped member 46. Such can be of the ball bearing type of simply comprise permanently lubricated bearing bushings press fitted into the openings 82 and 84, and such is not illustrated as they would only tend to obscure the invention.

Disposed about the shaft 80 and intermediate the flanges 48 and 50 is a drive collar or wheel 90, the latter being removably secured to the shaft 80 so as to be immovable thereon by set screws such as indicated at 92. The arrangement permits slidable removal of the wheel 90 for replacement purposes on loosening the screws 92.

Though cross hatched to suggest the wheel 90 as being made of metal, the wheel 90 is for the purpose of achieving a substantial frictional engagement with the wheel 20, and with this in mind it will be evident that the wheel 90 can be of a metal such as steel and have its peripheral cylindrical surface 94 suitably serrated or knurled to enhance its frictional purchase on the tire 38 as shown, or that the same can have, in lieu of such surface irregularities, a friction enhancing surface layer such as neoprene bonded to the exterior. Other alternatives commonly used in friction drives will readily come to mind such as forming the entire wheel of a durable elastomeric material (suitably reinforced about the screws 92) with abrasive particles embedded therein, or a metal wheel 90 can be tightly embraced by a band such as employed in power pulley belt drives. Indeed, excellent results have been obtained wherein the wheel 90 is a common grinding wheel of bonded particles of alumina or silicon carbide.

The motor 70 is powered by heavy electric storage batteries 100 and 102 such as used in automobiles, aircraft, sea craft and the like, such batteries being disposed on opposite sides of the rear wheel 20 as shown and carried by open frame steel cradles 104 welded to the frame portions 40 and 42.

Referring to FIG. 10, it will be seen that the batteries 100 and 102 are connected in series with the motor 70 and a normally open heavy duty relay controlled switch that includes a fixed contact 106 and a movable contact 108. The contact 108 moves into engagement with the contact 106 on energization of the solenoid 110 of the relay 112 to complete the direct current circuit comprised of the battery 100, battery connecting lead 114, battery 102, motor lead 116, motor 70, and relay switch leads 118 and 120 to energize the motor. The battery 100 is connected to energize the relay solenoid 110 under the control of normally open, spring biased switch 122 by a solenoid lead 124 and switch leads 126 and 128. The arrangement is such that the motor 70 is normally deenergized, but is energized whenever the operator closes the switch 122 against its bias. The switch 122 is located on the vehicle 10 at a position conveniently accessible to the rider, and with the particular form of vehicle 10 illustrated, the switch 122 can be of the push button type and located at the upper extremity of the hand grip portion 130 of the lever steering means in an arrangement somewhat like the positioning of a gun firing button on the joy stick of fighter aircraft.

The described system for controlling energization of the series wound electric motor 70 is essentially an on-off system. If deemed desirable or expedient it is deemed well within the skill of the art to provide a control system such as long used in the control of the electric motors of direct current powered street cars and buses.

The operation of the form of the invention shown in FIGS. 1-10 will be readily understood on reference to FIGS. 7, 8 and 9. As will be evident, the center of mass of the unit 44 and of the parts movable therewith is such that the unit 44 tends to swing rearwardly with a modest degree of torque so that the wheel 90 bears lightly against the radial periphery of the wheel tire 38. Not only is such center of mass disposed to cause such effect, but also the center of mass is disposed so that rearward swinging movement or torque is enhanced or further augmented on forward acceleration of the vehicle 10. In order to further assure engagement of the frictional surface 94 of the wheel 90 with the surface of the tire 38, coiled tension springs 140 may be connected between the legs 54 and 56 and the frame 12.

It will be evident to those conversant with the art that means not shown can be provided for selectively opposing the springs 140 and preventing contact of the wheel 90 with the tire 38 whereby the friction drive system can be selectively disabled.

The relative positions of the wheel 90 and the tire 38 when the torque urging rearward swinging movement of the unit 44 is modest is shown in FIG. 7. The electric motor 70 drives the shaft 80 and wheel 90 to rotate counterclockwise as shown by the arrow 142, and in its frictional engagement with the wheel 20 drives the latter to rotate clockwise or forwardly as indicated by the arrow 144.

When the motor 70 is energized and the wheel 20 frictionally driven forwardly, the unit 44 is subjected by reaction to a torque urging the same rearwardly, and this in turn automatically increases the force with which the wheel 90 bears radially against the tire 38. Since the tire 38 is radially resilient, such increased force results in local deformation of the periphery of the tire 38 as shown in FIG. 8 so that the area of contact between the wheels 90 and 38 is increased. Such increase in bearing force and contact area acts to preclude slippage between the wheels 20 and 90.

FIG. 9 shows with some exaggeration the automatically attained position of the parts on the imposition of still greater frictionally applied torque to the wheel 20.

Conversely, a reduction in driving torque or frictional force automatically reduces the force normal to the frictional force, whereby residual drag is minimized.

Needless to say, the same radial force between the wheels 20 and 90 depicted in FIG. 9 could be continuously maintained by a much simpler structure; however, such a system would result in maximum rolling friction losses (due to tire flexing and continuously maximized bearing loads) at all times, even when the motor 70 is deenergized and the vehicle 10 is coasting.

It will be manifest that the illustrated and described system is such as to automatically increase the radial force to prevent frictional slippage, or stated conversely, the system is such as to automatically minimize rolling friction losses as much as possible while maintaining adequate bearing force for frictional drive.

The apparatus shown in FIGS. 1–10 enables a rider to propel the wheel 20 by leg power and/or electrical power as well as to coast or brake the same. Such alternatives or modes are electively available to the rider and experienced cyclists will readily appreciate the value of the system. It will be observed that when the vehicle is coasting or being pedaled (the motor deenergized), the wheel 20 urges the unit 44 to still further reduce rolling friction loss.

The batteries 100 and 102 can be interchanged for charged batteries as needed, or recharged in situ when the vehicle is not in use.

An alternative to the mounting of the batteries 100 and 102 on the vehicle 10 is shown in FIGS. 11 and 12, such alternative comprising the omission of the cradles 104 from the vehicle 10, and in lieu thereof the provision of a U-shaped tow bar 150 fixed to the rear ends of the frame portions 40 and 42 to extend horizontally and rearwardly so as to position the bight portion 152 of the tow bar 150 rearwardly of the wheel 20. The bight portion 152 of the tow bar 150 is provided with conventional hitch means 154 for detachable connection to the forward end of the tongue 156 of a conventional wheeled cart or trailer 158. The batteries 100 and 102 are carried upon the trailer 158 as shown. The electrical system employed with this modification is identical to that hereinabove described, and it will be understood that depiction of the electrical leads in FIGS. 11 and 12, as their dress and detachable coupling adjacent the hitch means 154 in omitted as being unnecessary in view of the common knowledge of analogous provisions in the prior art of coupling electric power from a tractor to devices in a (detachably coupled) trailer.

FIG. 13 illustrates another modification of the invention, and specifically deals with another embodiment of the frictional driving unit, such modified frictional driving unit being designated generally at 160. The unit 160 comprises an electric motor 162 secured to the upper extremities of the legs or struts 54 and 56, and such motor 162 drives a pulley 164 disposed in the plane of the wheel 20. Disposed between and journaled in the legs 54 and 56 is a driven pulley 166, the latter being driven by an endless belt 168 entrained over the same and the pulley 164. The thickness of the belt 168 is greater than the depth of the groove in the pulley 166 in an arrangement such that the outer surface of the belt 168 engages the radially outermost surface of the penumatic tire 38. The belt 168 is preferably of the "V" type and is made of the same character of materials as are the various belts employed with automobile engines (such as the fan, water pump, and alternator drive belts) and therefore has an outer surface of rather high friction character. Such frictional character is probably largely due to the rubberlike elastomeric substances included in such belts. The motor 162 is included in the electrical system in the same manner as the previously described motor 70. As in the case of the motor 70, the motor 162 is preferably series wound, but can be of any suitable direct current type to suit the user's preference, such as, for example, the well known shunt or compound types.

The operation of the form of the invention shown in FIG. 13 will be manifest in the light of the previously described embodiment of the invention.

Attention is now directed to a still further embodiment of the invention, and this embodiment also deals with yet another form of drive unit, and such is designated generally at 180. The unit 180 is very similar to the previously described unit 44 and differs therefrom in that the U-shaped member 46 has two rather than a single electric motor mounted thereon, such two motors 182 and 184 being mounted upon the opposite sides of the member 46. The output shafts (not shown) of the motors 182 and 184 are journaled through the member 46 and are drivingly coupled to a drive wheel 186 that is generally similar to the previously described drive wheel 90.

As in the case of the drive unit 44, the drive wheel 186 frictionally engages the radially outward periphery of the pneumatic tire 38.

The electric motors 182 and 184 are preferably arranged to be energized in electrical parallel and connected in the circuit of FIG. 11 in lieu of the motor 70. The motors 182 and 184 can, if desired, be arranged in electrical series with each other. The motors 182 and 184 are of the DC type and are connected so as to aid one another in driving the wheel 186, and such motors can be of any of the types suggested previously in connection with the motors 70 and 162, and indeed, the motors 182 and 184 need not be of identical types. For example, some users might prefer the speed and torque characteristics resulting from one of the motors being series wound and the other being shunt wound with the motors being in electrical series or in parallel. Numerous other arrangements will readily come to the minds of those skilled in the art and further elaboration is deemed unnecessary.

The operation of the unit 180 will not require elucidation in view of the previously described operation of the units 44 and 160.

Attention is now directed to still another drive unit embodiment, the same being shown in FIG. 15 and designated generally at 200. In this form of the invention a considerably larger U-shaped member 202 is employed than that designated at 46 in the unit 44, and such member 202 is pivotally mounted on the vehicle frame 12 of the vehicle 10 in a manner analogous to that of the member 46 by means of legs or struts 204 and 206 in lieu of the struts 54 and 56. An electric motor 208 is mounted on the member 202 by a bracket 210, and the output shaft 212 of the motor 208 is journaled through a flange portion 214 as shown.

Another shaft 216 is rotatably journaled through and is longitudinally slidable through a flange portion 218 of the member 202 that opposes the flange 214. As clearly shown in FIG. 15, the shafts 212 and 216 are in axial alignment, and attached to one end of the shaft 216 by means indicated at 220 is a frustoconical drive wheel 222.

The frustoconical drive wheel 222 has its axis aligned with the axes of the shafts 212 and 216, and preferably has an axial length at least as great as the tread width of the pneumatic tire 38 of the wheel 20. The frustoconical wheel 222 has a cylindrical opening 224 therein which slidingly receives the shaft 212 therein. Fixed to the wheel 222 within the bore 224 is a key 226 that is slidably received in a key way 228 provided in the shaft 212, the arrangement being such that the wheel 222 can be shifted axially relative to the shaft 212, but relative rotation between the wheel 222 and the shaft 212 is prevented.

Inspection of FIG. 15 will make it evident that the axial position of the frustoconical wheel 222 can be shifted toward the motor 208 to vary the amount that the former will overlap the tread 230 of the tire 38, and that with increasing overlap, the diameter of the wheel 222 engaged by the tread 230 increases. Such variation of the overlap effectively varies the drive ratio between the frictional driving wheel 222 and the wheel 20.

Means is provided for enabling rider control of the axial position of the frustoconical drive wheel 222, and such means comprises a bell crank 234 pivotally mounted at 236 on a bracket 238 fixed to the flange 218. One leg 240 of the bell crank 234 is slotted at 242 with such slot slidingly receiving therethrough a pin 244 that is disposed within a bifurcated portion 246 of a free end of the shaft 216 disposed about the slotted leg 240. The arrangement is such that rocking of the bell crank 234 will axially move the drive wheel 222 in a direction dependent upon the direction that the bell crank 234 is rocked. A rider actuale rod 248 (only partially shown) is pivotally connected at 250 to the free end of the other leg 252 of the bell crank 234 whereby the rider can rock the latter and thereby position the frustoconical drive wheel 222 for such drive ratio as may be desired.

Though the frustoconical wheel 222 is sectioned as being metal, the same general considerations discussed in connection with the drive wheel 90 and its surface character are generally applicable.

Apart from the variable drive ratio feature of the unit 200, the same functions in the same general fashion as the previously described units 44, 160 and 180, and elaboration is not thought to be appropriate.

Attention is now directed to the appended claims.

I claim:

1. In a frictional drive system of the type wherein a wheel is mounted for rotation about its axis and wherein a driving member is provided that has a movable endless peripheral part that travels a closed planar track that is external to and coplanar with the wheel, and wherein a portion of the peripheral part of the driving member bears with force against and is in frictional engagement with an external peripheral portion of the wheel whereby movement of the driving member peripheral portion in one direction frictionally urges movement of the wheel peripheral portion in such one direction, the improvement comprising means for automatically varying the bearing force in response to variations in the magnitude of reactive force experienced by the driving member in frictionally urging rotation of the wheel, said means comprising the provision of means for mounting the driving member for pivotal movement about a pivot axis that is parallel to the wheel axis and spaced from the latter an interval less than the radius of the wheel, whereby the driving member can move toward and away from the wheel along a path that is angularly intermediate the directions of the bearing and frictional forces, whereby the bearing force can be minimized as it tends to vary in a manner sufficient to sustain essentially non-sliding frictional engagement of the driving member with the wheel and wherein the position of frictional engagement is spaced from the pivot axis a distance at least as great as the radius of the wheel.

2. The combination of claim 1, wherein the wheel is peripherally provided with means for yieldingly and resiliently opposing said bearing force.

3. The combination of claim 1, wherein said means for mounting said driving member comprises an elongated strut pivoted about said pivot axis, and said driving member being mounted on said strut at a position outside the periphery of the wheel.

4. The combination of claim 1, including means inclusive of a tapered member for varying the length of the periphery of the driving member part that engages the wheel.

5. The combination of claim 1, including means for selectively varying the spacing of the pivot axis from the axis of the wheel, whereby the rate at which the bearing force varies in relation to the friction force can be adjusted.

6. In a vehicle having a ground support traction wheel provided with an improved means for applying a torque to such wheel to propel the vehicle, comprising means for imparting a tangential frictional force to the radial periphery of the wheel, said means including a driving unit together with means for mounting the same on the vehicle for movement relative to the wheel in a direction that is inclined to the direction of the tangential force in an arrangement such that the driving unit is urged radially inwardly relative to the gound wheel to engage the latter with a force that varies as a function of the magnitude of the frictionally imparted torque, and said unit including a driving assembly having an endless peripheral component movable in a plane coplanar with the ground wheel, said wheel and the endless component having their radially outermost peripheral portions in frictional engagement with each other, at a position of frictional engagement said means for mounting the unit including a strut pivotally mounted about a pivot axis that is parallel to the axis of the wheel and spaced from the latter a distance less than the radius of the wheel, with said unit being carried by the strut, the arrangement being such that the movement of the unit is arcuate and concave toward the wheel wherein the strut has an extent between the pivot axis and the point of frictional engagement at least as great as the radius of the wheel.

7. The combination of claim 6, wherein the driving unit includes a prime mover operatively coupled to the endless component.

8. The combination of claim 6, wherein the driving assembly having an endless peripheral component is a drive wheel, and at least one of the wheels having an outermost radial periphery that is resiliently radially compressible.

9. The combination of claim 8, wherein the drive wheel has a radially outermost surface includes means for enhancing the coefficient of friction thereof with respect to its frictional engagement with the ground wheel.

10. The combination of claim 8, wherein the strut is upstanding with the pivot axis being horizontally displaced from the axis of the ground wheel.

11. The combination of claim 8, wherein the drive unit includes an electric motor drivingly connected to the drive wheel.

12. The combination of claim 8, wherein the drive wheel is of frusto-conical configuration and is mounted for axial movement relative to the ground wheel, and means for controlling the axial position of the drive wheel, whereby the drive ratio can be controllably varied.

13. The combination of claim 8, including means for selectively setting the spacing of the pivotal axis from that of the ground wheel, whereby the rate at which the normal force varies in relation to the frictional force can be adjusted.

14. The combination of claim 6, including spring means for urging the endless component toward engagement with the wheel, whereby the certainty of such engagement is enhanced despite inertial accelerations occasioned by passage of the vehicle over uneven terrain.

* * * * *